United States Patent
Chen et al.

(10) Patent No.: US 10,382,306 B2
(45) Date of Patent: Aug. 13, 2019

(54) APPLICATION NETWORK USAGE MANAGEMENT

(71) Applicant: AirWatch, LLC, Atlanta, GA (US)

(72) Inventors: Lucas Chen, Atlanta, GA (US); Deep Singh, Atlanta, GA (US); Iury Bessa, Atlanta, GA (US); Rajiv Singh, Atlanta, GA (US); Raghuram Rajan, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 239 days.

(21) Appl. No.: 14/792,562

(22) Filed: Jul. 6, 2015

(65) Prior Publication Data

US 2017/0012846 A1   Jan. 12, 2017

(51) Int. Cl.
*H04L 12/24* (2006.01)
*H04L 12/26* (2006.01)

(52) U.S. Cl.
CPC .......... *H04L 43/0876* (2013.01); *H04L 41/14* (2013.01); *H04L 43/062* (2013.01)

(58) Field of Classification Search
CPC ... H04L 43/0876; H04L 41/14; H04L 43/062; H04L 43/04
USPC ................................................. 709/223, 224
See application file for complete search history.

(56) References Cited

U.S. PATENT DOCUMENTS

| | | |
|---|---|---|
| 9,438,491 B1 | 9/2016 | Kwok et al. |
| 9,639,412 B1 | 5/2017 | Levy et al. |
| 2007/0209005 A1 | 9/2007 | Shaver et al. |
| 2011/0231551 A1 | 9/2011 | Hassan et al. |
| 2012/0117478 A1* | 5/2012 | Vadde ........................ G06F 9/54 715/736 |
| 2012/0198046 A1* | 8/2012 | Shah ...................... G06Q 30/04 709/224 |
| 2013/0260713 A1* | 10/2013 | Toy ..................... H04L 12/1403 455/406 |
| 2013/0291086 A1* | 10/2013 | Pontillo .............. H04L 63/0823 726/10 |
| 2014/0024339 A1 | 1/2014 | Dabbiere et al. |
| 2014/0344437 A1* | 11/2014 | Huang ................ H04L 67/2814 709/223 |

(Continued)

OTHER PUBLICATIONS

Office Action dated for U.S. Appl. No. 15/131,067.

*Primary Examiner* — Brian Whipple
*Assistant Examiner* — James Ross Hollister
(74) *Attorney, Agent, or Firm* — Thomas | Horstemeyer, LLP

(57) ABSTRACT

Disclosed are examples that relate to monitoring network usage by client devices and enforcing compliance rules related thereto. In various examples, a system can intercept a network call in transit from a client application to an operating system of a client device, wherein the network call is configured to cause a content provider to transmit content to the operating system over a carrier network, and wherein the network call is further configured to cause the operating system to transmit the content to the client application; can modify the configuration of the network call such that the network call causes the operating system to transmit the content to the management component; can receive the content from the operating system; can analyze the content for network usage; can create a network usage analysis; and, can provide the content to the client application.

20 Claims, 7 Drawing Sheets

(56) References Cited

U.S. PATENT DOCUMENTS

| | | | | |
|---|---|---|---|---|
| 2014/0378091 A1* | 12/2014 | Irwin | H04M 15/59 | 455/405 |
| 2015/0007259 A1* | 1/2015 | Peterson | G06F 21/54 | 726/1 |
| 2015/0052595 A1* | 2/2015 | Murphy | G06F 21/44 | 726/7 |
| 2015/0117226 A1* | 4/2015 | Kim | H04W 4/26 | 370/241 |
| 2015/0120861 A1* | 4/2015 | Huang | H04L 67/2819 | 709/213 |
| 2015/0215816 A1* | 7/2015 | Abou-Elkheir | H04N 21/25866 | 370/230 |
| 2015/0326497 A1* | 11/2015 | Guionnet | G06Q 10/06 | 709/224 |
| 2015/0363289 A1* | 12/2015 | Brough | H04W 24/10 | 709/224 |
| 2016/0127210 A1* | 5/2016 | Noureddin | H04L 43/065 | 455/405 |

* cited by examiner

APPLICATION NETWORK USAGE MANAGEMENT

BACKGROUND

Employees of enterprises often utilize client devices to perform their job functions. Client devices can require connectivity to a network through which the client devices, and applications executed thereby, can send and receive data. It can be advantageous to monitor the network usage by client devices and applications to account for the cost of such network usage. However, many client devices and applications are not configured to and/or are not capable of adequately monitoring network usage. Additionally, many client devices and applications do not provide mechanisms for evaluating and enforcing compliance rules that are violated by certain types and/or levels of network usage.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
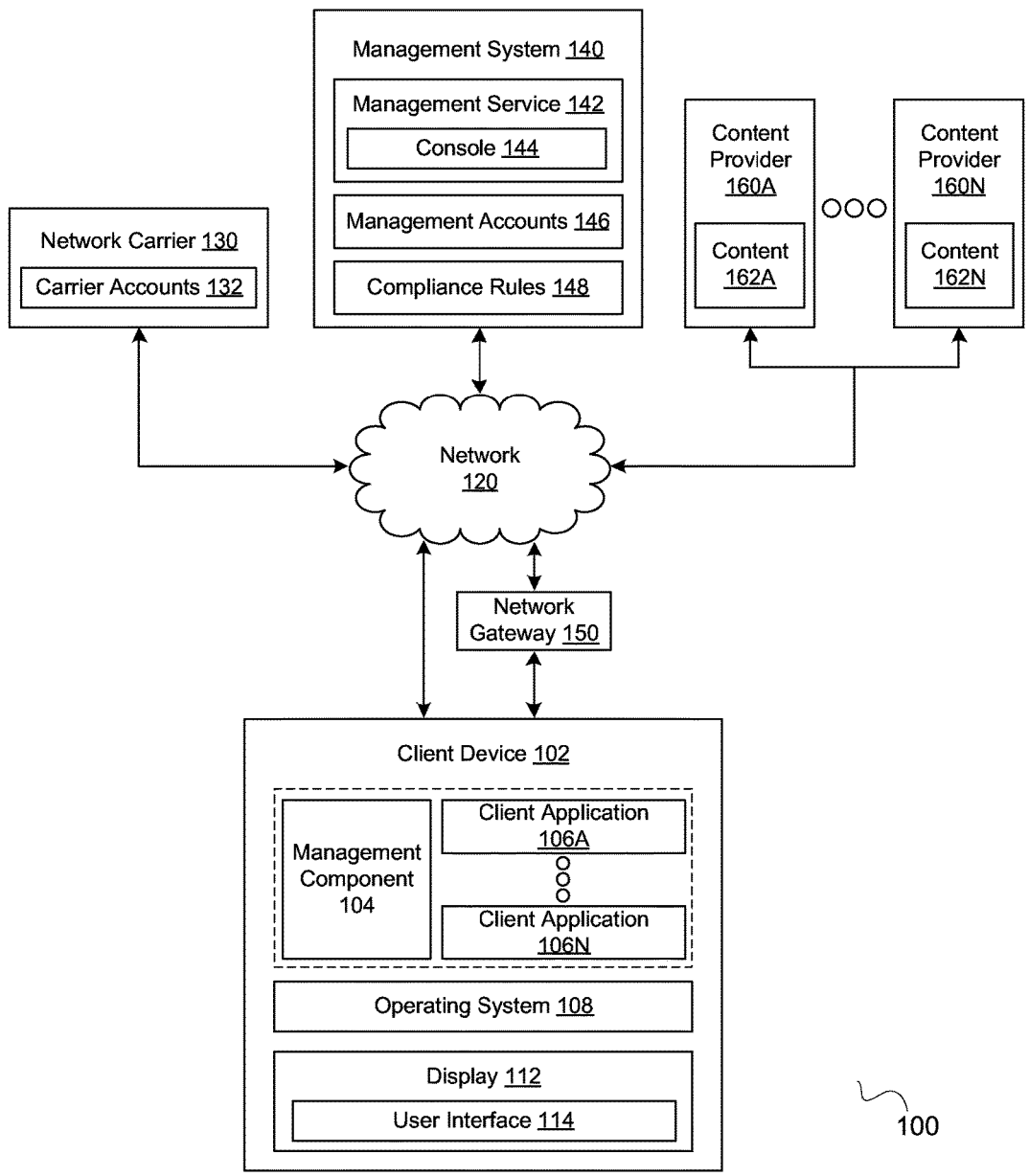
FIG. 1 is a drawing of a networked environment according to various examples of the disclosure.

The present disclosure relates to monitoring network usage by client devices and enforcing compliance rules related thereto. In some examples, a user of a client device can access a network to send and receive data over the network, which the user can access using a carrier account associated with a network carrier that provides the network. The carrier account can be allotted a certain amount of network usage (i.e., an amount of data consumed over the network through uploads and downloads of content over the network). The carrier account can be associated with a data plan that is replenished to a certain data allotment on the first day of a billing cycle. Alternatively, the carrier account may be replenished in an ad hoc manner at the request of an administrator of the carrier account.

In some examples, a carrier account can be specific to one or more particular client devices, such that only those particular client devices can consume data over the network using the data allotment. In other examples, a carrier account can be specific to a particular user such that one or more client devices associated with such user can consume data over the network using the data allotment. For instance, an employee of an enterprise may use the same carrier account to consume data over a network using her smartphone, her tablet, and her laptop, all of which may—through their consumption of data over the network—cause the remaining data allotment of her carrier account to be reduced.

In some examples, a user of a client device may utilize various client applications (executed by the client device) to access content (i.e., data) from content providers that are accessible to the client device over the network. For instance, an employee of an enterprise can use her smartphone to access her corporate email account (using an email application), which can require the smartphone to send content to and receive content from a first content provider (such as Microsoft Exchange®). Additionally, the employee can use a tablet to access a content repository (using a content rendering application), which can require the tablet to send content to and receive content from a second content provider (such as Microsoft SharePoint®). Further, the employee can use a laptop to look up scores for her favorite teams (using a sports application), which can require the laptop to send content to and receive content from a third content provider (such as ESPN®).

In some examples, the client applications that access content from content providers are not configured to analyze the amount of data consumed over the network by such operation. In particular, the client applications may not include instructions (i.e., code) that cause the content to be analyzed for network usage. Additionally, the client applications may delegate the network operations required to access content from content providers to an operating system of the client device. Like the client applications, the operating system of the client device may not include instructions that cause the content to be analyzed for network usage.

To overcome this challenge, a management component can be implemented to analyze the content for network usage. In some examples, the management component can intercept network calls (i.e., method calls that provide network capability) made by client applications to the operating system of the client device. For instance, a management component can intercept network calls belonging to the NSURLSession or NSURLConnection Objective C classes that are transmitted by a client application to an Apple iOS® operating system. The management component can modify the network call to cause the operating system to return the content to the management component, rather than causing the content to be returned to the client application (as configured before the modification).

The management component can transmit the modified network call to the operating system. The operating system can receive the modified network call and can execute the modified network call. The modified network call, when executed, can cause the operating system to establish a communication channel with the content provider (through a network interface of the client device), receive content from the content provider over the communication channel, and transmit the content to the management component. The management component can receive the content from the operating system, and can analyze the content for network usage before returning the content to the client application.

Additionally, the management component can report the analysis of the network usage to a management service. The management service can log the analysis of the network usage in a management account, which can be associated with a user, a client device and/or a carrier account. The management account can track and provide historical reports of network usage consumed by client applications, which can be aggregated by user, client device or carrier account. The management service can notify an administrator and/or user of the management account when the network usage associated with the management account violates compliance rules. The management service can also perform other remedial actions when the network usage associated with the management account violates compliance rules, such as disabling network access and/or replenishing the data allotment of the associated carrier account.

Turning now to the figures, with reference to FIG. 1, shown is a networked environment 100 according to various examples. The networked environment 100 can include a client device 102, a network carrier 130, a management system 140, a network gateway 150, and a plurality of content providers 160A . . . 160N, which can be in data communication with one another over a network 120. The network 120 can include, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks.

In some examples, the network 120 can be provided by a network carrier 130. The network carrier 130 can provide one or more of a cellular network and a local access network (LAN). The network carrier 130 can provide network access to users and/or client devices 102 that are associated with a carrier account 132. The network carrier 130 can store carrier accounts 132 in a data store accessible to the network carrier 130. The network carrier 130 can update the carrier accounts 132 upon network usage by users and/or client devices 102 associated with the carrier accounts 132.

In some examples, a carrier account 132 can be specific to a client device 102, such that only that client device 102 can use the carrier account 132 to access the network 120. In other examples, a carrier account 132 can be specific to a user, such that any client device 102 associated with the user can use the carrier account 132 to access the network 120. Yet in further examples, a carrier account 132 can be specific to a group of users (i.e., a "pooled account"), such that any client device 102 associated with any of the users can use the carrier account 132 to access the network 120. For instance, the members of a pooled carrier account can include the members of a management grouping stored by the management service 142.

The carrier account 132 can be associated with a data allotment (i.e., an amount of data that the owner of the carrier account 132 is permitted to consume or use over the network 120). In response to a carrier account owner consuming data over the network 120, the data allotment of the carrier account 132 can be reduced in an amount equal to the amount of data consumed. If the carrier account owner seeks to access a resource over the network 120 that is larger than the data allotment of her carrier account 132, the action may be prohibited until an administrator of the carrier account 132 replenishes the data allotment of the carrier account 132 to an amount greater than or equal to the size of the resource.

The network carrier 130 can include an API through which the management component 104 and management service 142 can send commands to the network carrier 130. In some examples, a request to replenish a particular carrier account 132 to a particular data allotment can be transmitted to the network carrier 130 through the API to cause the network carrier 130 to replenish the data allotment of the carrier account 132 to a particular amount. Additionally, the network carrier 130 and the management service 142 can establish a communication channel through which information contained in carrier accounts 132 and management accounts 146 can be synchronized.

In some examples, carrier accounts 132 can be replenished according to a "data plan" such that the carrier account 132 is replenished to a particular data allotment on the first day of a billing cycle associated with the data plan. For instance, a carrier account 132 can be replenished to a 3 GB data allotment on the first day of the month if the carrier account owner has subscribed to a 3 GB/month data plan with a first day of the month billing date. Additionally, in some examples, carrier accounts 132 can be replenished on an ad-hoc basis in response to a request by an administrator of the carrier account (or a carrier account owner) requesting a particular data allotment replenishment. For example, a carrier account owner can purchase a 2 GB data allotment and can apply it to her carrier account 132 whenever she notices that her data allotment is running low.

In some examples, a client device 102 can be configured to access the network 120 through a network gateway 150. The network gateway 150 can proxy data between the client device 102 and the content providers 160 (i.e., act as a network end-point and relay data between the two actual end-points—the client device 102 and the content providers 160). The network gateway 150 can analyze the proxied data for network usage, and can report information describing the network usage to the management service 142 or the management component 104.

The client device 102 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 102 can include a processor and a memory including instructions that, when executed by the processor, cause the processor to implement various functionality in the client device 102. For instance, the memory can store an operating system 108, various client applications 106A . . . 106N, and a management component 104, which can be executed by the processor to cause various functions to be performed by the client device 102.

The client device 102 can include a networking interface that provides networking capability for client applications 102, such as sending and receiving data over the network 120. The network interface can utilize an antenna of the client device 102 to access the network 120, such as a (cellular) carrier network. The network interface can access a particular network that a user of the client device and/or the client device is authorized to access. In particular, the network interface can identify a carrier account associated with a user of the client device and/or the client device, and can access a network provided by a network carrier that is associated with such carrier account. For instance, a Subscriber Identity Module (SIM) card of the client device 102 can specify a carrier account associated with the client device. The network interface 110 can be invoked by the operating system 108 of the client device 102 in response to receiving a network call from a client application 106. For instance, the Apple iOS® operating system can invoke the network interface in response to receiving a network call belonging to the NSURLSession or NSURLConnection Objective C classes.

Furthermore, the client device 102 can include input devices, such as a mouse, keyboard, touch pad, or touch screen, which can facilitate a user interacting with and controlling the client device 106. The client device 102 can also include output devices, such as a display 112 through which a user can view various user interfaces 114 rendered by various client applications 106.

The operating system 108 of the client device 102 can execute the various client applications 106 stored by the client device 102. In some examples, the client applications 106 can include productivity applications, Internet browser applications, email client applications, multimedia applications, news applications, navigation applications, game applications, or combinations thereof. For instance, a client application 106 can include an application configured to securely access content 162 from a content provider 160. In particular, such a client application 106 can be configured to establish a secure communication channel (e.g., HTTPS/SSL) with a content provider 160, authenticate with the content provider 160 (e.g., using identity management credentials), and receive content 162 from the content provider 160.

The client application 106 can be further configured to encrypt the content 162 received with an encryption key unique to the client application 106 to prevent other applications from deciphering the content 162, and can be configured to store the encrypted content 162 in a containerized data store to prevent other applications from accessing the encrypted content 162. Additionally, in response to a request to access the content 162, the client application 106 can be configured to cause the encrypted content 162 to be retrieved from the containerized data store, to cause the content 162 to be decrypted, and to cause the content 160 to be rendered in a user interface 114 of the display 112. Further, the client application 106 can be configured to cause certain operations to be disabled while the content 160 is rendered, such as a screen-capture function, a cut function, a copy function, and a paste function.

The various content providers 160A . . . 160N accessible to the client device 102 over the network 120 can store various content 162A . . . 162N, which can be specific to the type of content provider 160 storing the content 162. For instance, a content provider 160A can include an email server, which can store content 162A that includes email data, calendar data, and contact data. The client applications 106 can be associated with particular content providers 160 based on the type of content 162 required by the client applications 106. For instance, a client application 106A (e.g., an email client) can be configured to access particular content 162A (e.g., email data, calendar data, and contact data) from a particular content provider 106A (e.g., Microsoft Exchange®). Additionally, for example, a client application 106N (e.g., an application configured to securely render content 162) can be configured to access content 162 from multiple content providers 160, such as content 162B (e.g., documents) stored by a content provider 160B (e.g., DropBox®) and content 162N (e.g., videos) stored by a content provider 160N (e.g., YouTube.com®).

The client applications 106 can delegate the network operations associated with accessing content 162 from content providers 160 to the operating system 108 of the client device 102. In particular, the client applications 106 can be configured to transmit a network call to the operating system 108 to cause the operating system 108 to establish a communication channel with a content provider 160, request content 162 from the content provider 162, receive the content 162 from the content provider 160, and transmit the content 162 to the client application 160. For instance, a client application 106 can transmit network calls belonging to the NSURLSession or NSURLConnection Objective C classes to the Apple iOS® operating system 108 to cause content 162 to be sent and/or received from content providers 160.

Consequently, the client applications 102 can be configured to access content 162 from content providers 160 by: transmitting a network call to the operating system 108 to cause the operating system 108 to obtain the content 162 from the content providers 160, receiving the content 162 from the operating system 108, storing the content 162 in memory accessible to the client application 102, and rendering the content 162 in a user interface 114 of the display 112 of the client device 102.

The operating system 108 of the client device 102 can further execute a management component 104 stored by the client device 102. In some examples, the management component 104 can manage the client device 102 on behalf of the management service 142. That is, the management component 104 can implement instructions of the management service 142 at the client device 102 (on behalf of the management service 142). The management component 104 can communicate with the management service 142 over the network 120 using a secure communication channel. Over the secure communication channel, the management component 104 can receive commands from the management service 142 to implement at the client device 102 and the management component 104 can transmit status information describing the client device 102 to the management service 142.

In some examples, the management component 104 can control use of the client device 102 by configuring the client device 102. For example, the management component 104 can install configuration profiles on the client device 102, which can cause the operating system 108 of the client device 102 to operate in accordance with the specifications of the configuration profiles. Additionally, for instance, the management component 104 can transmit commands to application programming interfaces of the operating system 108 and/or of client applications 102 that cause the operating system 108 and/or client applications 102 to perform certain functionality.

In some examples, the management component 104 can monitor use of the client device 102. The management component 104 can, for instance, detect when client applications 102 transmit network calls to the operating system 102. In some examples, the management component 104 can determine whether the use of the client device 102 complies with compliance rules 148. For example, the management component 104 can determine that a compliance rule 148 prohibits network calls from being transmitted to the operating system 102 without being modified to cause content to be returned to the management component 104 rather than the client application 106 that initially generated the network call. Further, for instance, the compliance rule 148 can be limited to network calls transmitted by particular client applications 106, such that network calls transmitted by applications other than the particular client applications 106 are not subject to the compliance rule 148.

In some examples, the management component 104 can perform remedial actions when use of the client device 102 violates compliance rules 148. For example, the management component 104 can transmit notifications to one or more users of the client device 102 and/or administrators of the client device 102 specifying that certain compliance rules 148 are violated by the use of the client device 102. Additionally, for instance, the management component 104 can disable certain functionality of the client device 102, such as disabling particular client applications 106 (e.g., by shutting down the client applications 106), disabling access by the client device 102 to a network 120 (e.g., by disabling a network interface of the client device 102), and disabling the client device 102 (e.g., by locking the client device 102 or by erasing at least a portion of the memory of the client device 102).

The management component 104 can be embodied in various types of software. In some examples, the management component 104 can include an agent application, which can have administrative privileges with respect to the client device 102. The management component 104 can, for instance, install a management profile in a profile store of the client device 102 that provides management component 104 with administrative privileges with respect to the client device 102. The management component 104 can, using its administrative privileges, monitor the operations of the client device 102. For instance, the management component 104 can listen for method calls transmitted from client applications 102 to the operating system 108 of the client device 102.

The management component 104 can also use its administrative privileges to control the operation of the client device 102. For instance, the management component 104 can intercept network calls transmitted by certain client applications 102 to the operating system 108 and can modify such network calls to return content to the management component 104, rather than the client applications 102. Additionally, the management component 104 can transmit commands to an application programming interface of operating system 108 that cause the operating system 108 to perform certain operations on its behalf. For instance, the management component 104 can transmit a command that causes the operating system 108 to disable a network interface of the client device 102 (thereby preventing access to the network 120).

In some examples, the management component 104 can be executable instructions that are injected into a client application 106, which causes the functionality of the client application 106 to be modified. For instance, the management component 104 can be a software developers kit (SDK) that a developer of a client application 106 can include in the client application 106 before the source code of the client application 106 is compiled into binary code executable by the client device 102. Alternatively, for example, the management component 104 can include an application wrapper with which a client application 106 can be wrapped. In particular, the client application 106 can be wrapped by injecting the application wrapper (i.e., binary code) into the binary code of a client application 106 that has been compiled.

In any case, once combined with a client application 106 (either as an SDK or an application wrapper), the management component 104 can control use of the client application 106. In some examples, the management component 104 can monitor method calls transmitted from a client application 106 to the operating system 108. For instance, the management component 104 can identify network calls belonging to the NSURLSession or NSURLConnection Objective C classes.

Additionally, the management component 104 can modify method calls to cause the operating system 108 to perform a different operation than requested by a client application 106. For example, the management component 104 can modify network calls belonging to the NSURLSession or NSURLConnection Objective C classes such that the network calls cause content 162 fetched from content providers is returned to the management component 104, rather than to the client application 106 that generated the original network call.

In response to the operating system 108 executing the modified network call, the management component 104 can receive content 162 from the operating system 108. The management component 104 can store the content 162 in memory accessible to the management component 104. In some examples, the management component 104 can store the content 162 in memory that is inaccessible to the client application 106 and/or can otherwise enforce access control over the content 162. For instance, the management component 104 can encrypt the content 162 with an encryption key to which the client application 106 does not have access, preventing the client application 106 from decrypting (and accessing) the content 162. This can be particularly useful for examples where the management component 104 is embodied as an SDK or application wrapper, as the management component 104 may use the same storage space as the client application 104 in such examples. Additionally, for example, the management component 104 can instruct the operating system 108 to prevent the client application 106 from having the privilege to access the storage location containing the content 106.

The management component 104 can analyze the content 162 for network usage (i.e., the amount of data consumed over the network 120 to fetch the content 162 from the content provider 160) and can create a network usage analysis. In some examples, the network usage analysis can include one or more properties that describe an instance of network usage by the client device 102. In some examples, a network usage analysis can include one or more of: a record identifier (ID), a client device ID, an application ID, a personal use indicator, an enterprise use indicator, a content provider ID, a content ID, a content type, a session duration, a bytes received quantity, a packets received quantity, a bytes transmitted quantity, a packets transmitted quantity, a network carrier ID, a cellular network indicator, a Wi-Fi network indicator, a roaming indicator, a mobile country code (MCC), or a mobile network code (MNC).

The management component 104 can populate the network usage analysis by identifying data from one or more sources and associating the data with the properties described above. For example, the management component 104 can query a table of aggregated network usage analyses to determine the last used record ID, can add one number to the last used record ID, and can populate the record ID property of the instant network usage analysis with the newly created record ID. Alternatively, the management component 104 can request a newly created record ID from the management service 142, which may store a table of aggregated network usage analyses from which it can identify a last used record ID of which to base the newly created record ID.

Additionally, the management component 104 can request that the operating system 108 provide the management component 104 with certain data describing the network usage. In some examples, the management component 104 can transmit method calls to the operating system 108 that cause the operating system 108 to identify particular data requested by the method call and return the data to the management component 104. In any case, the operating system 108 can provide the management component 104 with data describing the client device 102, such as an IMEI number or other hardware identifier. Additionally, the operating system 108 can provide the management component 104 with certain data describing the network 102 used by the client device 102, such as a network carrier ID (or name), a cellular network indicator (i.e., indication that the network was a cellular network), a Wi-Fi network indicator (i.e., indication that the network was a Wi-Fi network), a roaming indicator (i.e., indication that the network was roaming), a MCC, and a MNC. In some examples, the operating system 108 can identify the data (to provide the management component 104) by querying the network interface of the client device 102, or by querying the SIM card of the client device 102. Once the management component 104 receives such data from the operating system 108, the management component 104 can populate the network usage analysis with the relevant properties.

Furthermore, the management component 104 can identify certain data describing the network usage by analyzing the network call that the client application 106 transmitted to the operating system 108 (which the management component 104 intercepts). For instance, the management component 104 can identify a source parameter of the network call (i.e., the source of the network call; a particular client application 106), and can associate the source parameter with an application ID. In some examples, the application ID can be an application bundle identifier (e.g., com.sports, sports.app) or an application name (e.g., Sports).

Also, the management component 104 can, in some examples, populate a personal use indicator (i.e., indication that the content 162 was consumed for personal reasons) and an enterprise use indicator (i.e., indication that the content 162 was consumed for enterprise reasons) based on the client application 106 (or its respective application ID). For instance, some client applications 106 can only be used for personal uses (e.g., Sports.app) and some client applications 106 can only be used for enterprise uses (e.g., HumanResources.app). Accordingly, the management component 104 can parse a table of "enterprise applications" and a table of "personal applications" to determine whether the network usage was personal or enterprise, which can be used to populate the personal use and the enterprise use indicators of the network usage analysis.

The management component 104 can also analyze the network call to identify a content parameter of the network call, and can associate portions of the content parameter with the content ID and the content type properties. For instance, if the content parameter of a network call contains "Report.doc," the management component 104 can populate the content ID property with "Report" based on the file name of the content parameter and can populate the content type with "Microsoft Word document" based on the file extension of the content parameter. The management component 104 can further analyze the network call to identify a content provider parameter of the network call, and can associate portions of the content provider parameter with the content provider ID property. For example, if the content provider parameter of a network call contains "www.SharePoint.com," the management component 104 can populate the content provider ID with either "www.SharePoint.com" or "SharePoint®."

Once the content provider ID, the content ID, and the content type are identified, the management component 104 can populate the personal use indicator and the enterprise use indicator based on one or more of such properties. That is, certain content provider IDs, certain content IDs, and certain content types can suggest that a network usage was personal use or that the network usage was enterprise use. For instance, content provider IDs such as "YouTube.com®," content IDs such as "JurassicWorld," or content types of "Video" can suggest that the network usage was a personal use. On the contrary, content provider IDs such as "Enterprise Development Repository," content IDs such as "Version8SourceCode," or content types of "Source Code" can suggest that the network usage was an enterprise use. Consequently, the management component 104 can parse a "personal use" listing and an "enterprise use" listing to determine whether, based on one or more of the content provider ID, the content ID, and the content type associated with the network usage, either the personal usage indicator or enterprise usage indicator should be populated in the network usage analysis.

Finally, the management component 104 can identify certain data describing the network usage by analyzing the content 162 sent to and/or received from the content provider 160. In some examples, content 162 (e.g., files, data) can be transmitted over a network 120 by breaking the content 162 up into a plurality of data packets. The plurality of data packets can be transmitted over the network 120 during a transmission session, which can begin when the first data packet (of the content 162) is sent over the network 120 and when the last data packet is sent over the network 120. At the conclusion of the transmissions session, the operating system 108 (or client application 106) can reassemble the data packets into the content 162 (i.e., to form the content data object).

Each data packet can include a header that stores information describing the data packet. In some examples, the management component 104 can analyze the header of each data packet transmitted over the network 120 during a transmission session to determine the network usage related to the transmission of the content 162 over the network. The management component 104 can identify the size of all data packets transmitted from the client device 102 to the content provider 160 during the transmission session, and can populate the bytes transmitted quantity property by summing the sizes of the data packets transmitted and can populate the packets transmitted quantity property by summing the number of data packets transmitted. Similarly, the management component 104 can identify the size of all data packets received by the client device 102 from the content provider 160 during the transmission session, and can populate the bytes received quantity property by summing the sizes of the data packets received and can populate the packets received quantity property by summing the number of data packets received. Furthermore, by analyzing the header to determine the time that each data packet was sent and/or received by the client device 102, the management component 104 can calculate the length of time that expired between the first data packet and the last data packet to populate the session duration property of the network usage analysis.

Alternatively, in some examples, the management component 104 can request that a network gateway 150 identify information describing the network usage. As previously described, the client device 102 can be configured to access the network 120 through the network gateway 150, which can monitor the network traffic between the client device 102 and content providers 162. For instance, the network gateway 150 can monitor the network traffic to identify a content provider ID, a content ID, and a content type with which to populate the network usage analysis. For instance, the network gateway 150 can identify a content provider ID by analyzing the network traffic to identify a URL to which the content 162 was sent (in the case that the client device 102 uploaded content 162 to the content provider 160) or from which the content 162 was received (in the case that the client device 102 downloaded content 162 from the content provider 160). The network gateway 150 can, for example, identify a content ID and content type by analyzing the network traffic for a file name associated with the sent and/or received content 162, and can associate the portion excluding the file extension with the content ID and associate the portion including the file extension with the content type. Furthermore, based on the content provider ID, content ID, and content type, the network gateway 150 can parse an a "personal content" listing and an "enterprise content" listing to identify information suggesting that the personal use indicator or the enterprise use indicator should be populated.

Also, similar to the management component 104, the network gateway 150 can analyze the data packets transmitted to and from the client device 102 to identify information in the header of the data packets that is correlated with one or more properties of the network usage analysis. The network gateway 150 can instruct the management component 104 to populate the respective properties of the network usage analysis with such information, or can create a network usage analysis itself. By analyzing the data packets, the network gateway 150 can identify a session duration, a bytes received quantity, a packets received quantity, a bytes transmitted quantity, and a packets transmitted quantity.

In any case, the management component 104 can create the data usage analysis in accordance with one or more privacy setting. In some examples, an administrator and/or a user of a management account 146 can configure a privacy setting through the console 144 of the management service 146, which can specify that certain data should not be collected. For instance, a privacy setting can specify that information related to one or more of the following properties should not be collect: client device ID, application ID, personal use indicator, enterprise use indicator, content provider ID, content ID, content type, session duration, bytes received quantity, packets received quantity, bytes transmitted quantity, packets transmitted quantity, network carrier ID, cellular network indicator, Wi-Fi network indicator, roaming indicator, MCC, or MNC.

In some examples, the management component 104 can query a listing of privacy settings associated with a management account 146 to determine whether any data describing the network usage should not be collected. If one or more privacy settings indicate that certain data should not be collected, the management component 104 can be configured to not collect such data and not populate the respective properties of the data usage analysis. For instance, if privacy settings indicate that information related to the carrier network ID and roaming status properties should not be collected, the management component 104 can fail to collect such information and fail to populate the carrier network ID and roaming status properties in data usage analysis.

Once the network usage analysis is created, the management component 104 can provide the content 162 to the client application 106. In some examples, the management component 104 can transmit the content 162 to the client application 106 using a secure inter-process communication channel. Alternatively, the management component 104 can release an access control over the content 162 to allow the client application 106 to access the content 162, such as by decrypting the content 162 or by instructing the operating system 108 to provide the client application 106 with access rights to the storage location of the content 162.

The management system 140 can be a computing environment operated by one or more enterprises, such as businesses or other organizations, to manage the use of at least one client device 102. The management system 140 can include a computing device, such as a server computer, that provides computing capabilities. Alternatively, the management system 140 can include multiple computing devices arranged in one or more server banks or computer banks. For examples in which the management system 140 includes multiple computing devices, the computing devices can be located in a single installation, or the computing devices can be distributed among multiple different geographical locations.

In some examples, the management system 140 can include computing devices that together form a hosted computing resource or a grid computing resource. In other examples, the management system 140 can operate as an elastic computing resource for which the allotted capacity of computing-related resources, such as processing resources, network resources, and storage resources, can vary over time. In other examples, the management system 140 can include or be operated as one or more virtualized computer instances that can be executed in order to perform the functionality that is described herein.

The management system 140 can include various systems that facilitate management of one or more client devices 102. The management system 140 can include a management service 142 that can perform various management operations. For instance, the management service 142 can perform several operations to bring a client device 102 into management (i.e., enrolling the client device 102). The management service 142 can establish a trust with the client device 102 through an installation of a management component 104 on the client device 102, such as a management profile that can be installed in a profile store of the client device 102. Additionally, the management service 142 can establish a secure communication channel with a management component 104 installed on the client device 102, such as with a management component 104 that includes an agent application or a management component 104 that is injected into a client application 106 through a SDK or application wrapper.

The management service 142 can store a plurality of management accounts 146, which can be specific to various client devices 102 and/or users of client devices 102. That is, a management account 146 can be associated with a certain user (and her respective client devices 102). Alternatively, a management account 146 can be associated with a certain client device 102 (and one or more users of such client device 102—such as when the client device 102 is a "shared device" amongst a group of users).

A management account 146 can be further associated with at least one carrier account 132. In one example, a management account 146 associated with a client device 102 can be associated with a carrier account 132 based on a relationship between the client device 102 and the carrier account 132. That is, a management account 146 can become associated with a carrier account 132 when a client device 102 associated with the carrier account 132 is enrolled into the management service 142 (causing a management account 146 associated with the client device 102 to be created and become further associated with the carrier account 132). This can occur, for instance, when an employee of an enterprise enrolls her personal client device 102 (that operates using her personal carrier account 132) into the management service 142 so that she can access enterprise resources using her personal client device. Similarly, a management account 146 associated with a user can be associated with a carrier account 132 based on a relationship between the user and the carrier account 132. For instance, a user and a carrier account 132 can be related in an instance where the carrier account 132 is a pooled carrier account.

In some examples, the management service 142 can create a management account 146 associated with a client device 102 when the client device 102 is enrolled into the management service 142 (by establishing a trust between the client device 102 and the management service 142). Also, the management service 142 can create a management account 146 associated with a user upon the user providing an email address with which to identifier herself (during a user enrollment process). In any case, the management account 146 can be further associated with one or more carrier accounts 132 that the members (i.e., users or client devices 102) of the management account 146 can use to access the network 120.

The management account 146 can include a plurality of information describing the characteristics and state of an associated user, client device 102, or carrier account 132. The management service 142 can update the management account 146 in response to changes to the characteristics or state of an associated user, client device 102, or carrier account 132. More specifically, the management service 146 can query one or more of the management component 104, the operating system 108 of the client device 102, the network gateway 150, and the network carrier 130 to identify information related to characteristics or state of an associated user, client device 102, or carrier account 132, and can add and/or change information contained in the management account 146 as necessary to keep the information up-to-date.

As an example, the management component 104 can identify that a particular client device 102 has been jailbroken. The management component 104 can transmit information related to the jailbroken state of the client device 102 to the management service 142, which can cause the management service 142 to add such information to each management account 146 associated with the client device 102. In particular, the information related to the jailbroken state of the client device 102 can be added to a management account 146 associated with the client device 102 (i.e., a device-specific management account), a management account associated with the user of the client device 102 (i.e., a user-specific management account), and a management account associated with a carrier account 132 to which the client device 102 has access (i.e., a carrier-specific management account).

The management service 142 can provide a console 144, through which the management service 142 can be configured by users with sufficient administrative privileges. The console 144 can provide an administrative dashboard and an end-user dashboard. Through the administrative dashboard, an administrator of the management service 142 can manage (i.e., create, configure, and monitor) management accounts 146 for various client devices 102 and/or users of client devices 102. Through the end-user dashboard, an end-user of the management service 142 can manage management accounts 146 for her various client devices 102. For instance, a user of a client device 102 that is enrolled to the management service 142 may access the end-user dashboard to manage such client device 120, and any other client device 102 that is enrolled with the management service 142 and associated with the user.

In some examples, compliance rules 148 can be defined through the console 144 of the management service 142, which the management service 142 can enforce upon client devices 102 under its management. In some examples, the compliance rules 148 can specify one or more conditions that must be satisfied for particular client devices 102 to be deemed compliant with the compliance rules 148. For instance, a compliance rule 148 can specify that only authorized client applications 106, such as applications listed on a whitelist of authorized applications, should access the network 120. As another example, a compliance rule 148 can specify that a particular client application 106 is only authorized to consume 1 GB of data from a particular carrier account 132 each month. As another example, a compliance rule 148 can specify that a particular user is only authorized to consume 3 GB of data over the network 120 for personal use using her smartphone, tablet, and laptop client devices 102. Additionally, the compliance rules 148 can prohibit any network usage by a user, client device 102, or carrier account 132 from exceeding configurable thresholds, which can be specific to a regular period (e.g., billing cycle, month) and to certain client applications 106. In particular, the compliance rules 148 can prohibit a particular user, client device 102, or carrier account 132 from maintaining a session of a threshold duration, receiving a threshold amount of bytes during a session or a period, receiving a threshold amount of packets during a session or a period, transmitting a threshold amount of bytes during a session or a period, or transmitting a threshold amount of packets during a session or a period.

In any case, the management service 142 can evaluate the compliance rules 148 by obtaining information from various sources and determining whether the information indicates that the compliance rules 148 are violated. In some examples, the management service 142 can communicate with one or more management components 104 of a client device 102 to obtain information related to the client device 102, such as hardware, operating systems, applications, location and time, and network usage information related to the client device 102. The management service 142 can also communicate with the network gateway 150 to obtain information related to network usage. Additionally, the management service 142 can communicate with the network carrier 130 to obtain information related to carrier accounts 132.

In some examples, the compliance rules 132 can specify one or more remedial actions that should be performed in an instance in which the conditions specified by the compliance rules 132 are not satisfied. The management service 142 can enforce the remedial actions in the event that a compliance rule 148 is violated. In some examples, a remedial action can include transmitting a notification to a user and/or administrator, which can include information describing the conditions of the compliance rule 148 and specify what condition caused the compliance rule 148 to be violated.

While the evaluation of compliance rules 148 and enforcement of compliance rules 148 has been described here as performed by the management service 142, the management component 104 can perform the same operations. The management component 104 can receive the compliance rules 148 from the management service 142, and can install them in storage accessible to the management component 104. The management component 104 can continuously evaluate compliance rules 148 as the management component 104 monitors the use of the client device 102, including network usage. If the management component 104 identifies information that indicates that a condition of a compliance rule 148 is not satisfied, the management component 104 can perform one or more remedial actions. For instance, the management component 104 can disable access to the network 102 for the client device 102 or a particular client application 106, can notify the user and/or an administrator of the violation and include information related to the violation, can transmit information related to the violation to the management service 142, and can transmit a request to replenish the data allotment of a carrier account 132 to a network carrier 130 (e.g., through an API of the network carrier 130).

Figure 2:
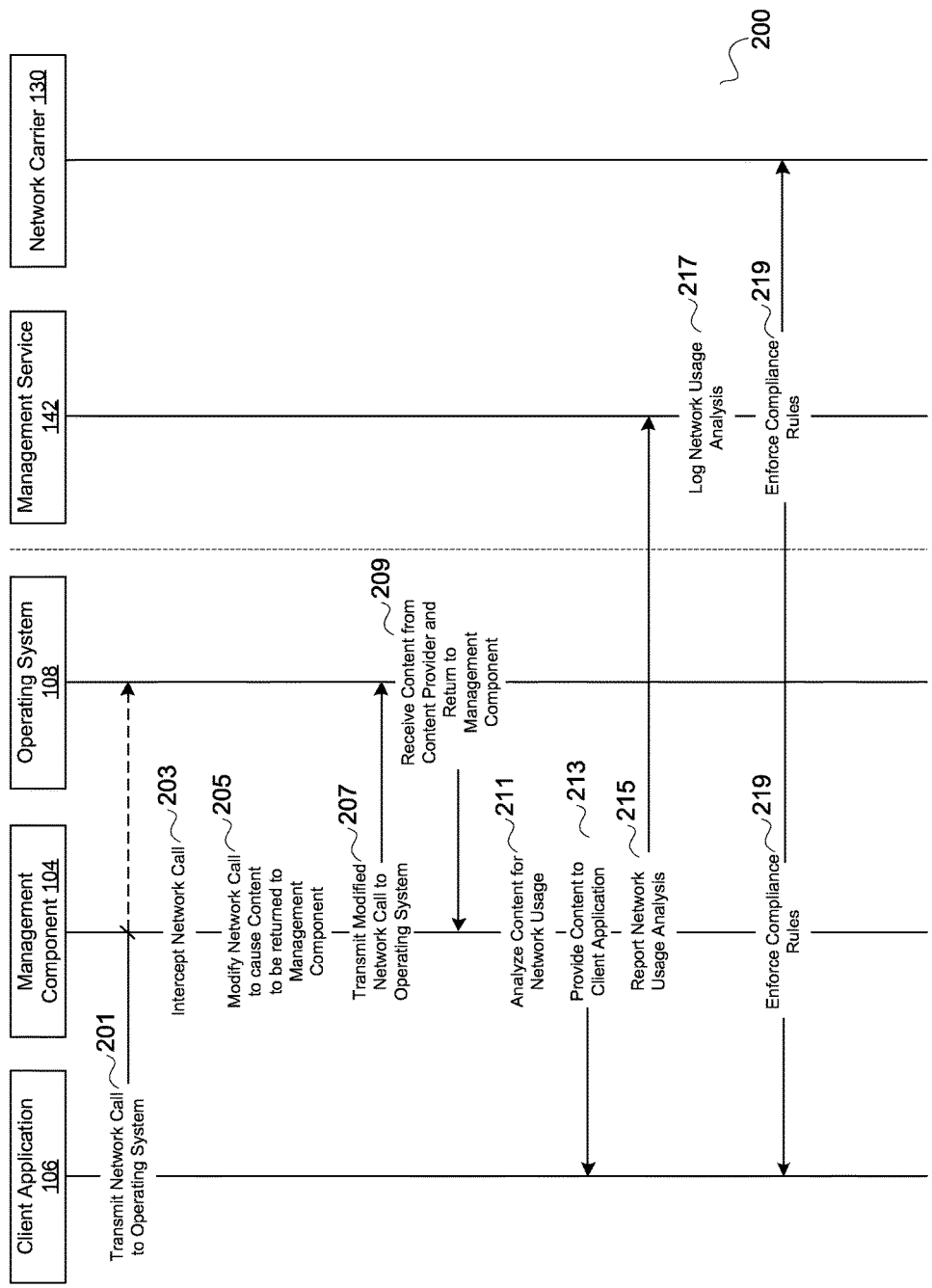
FIG. 2 is a sequence diagram illustrating an example component interaction according to various examples of the present disclosure.

Turning now to FIG. 2, shown is a sequence diagram 200 illustrating one example of interaction between the client application 106, the management component 104, the operating system 108, the management service 142, and the network carrier 130. Functionality attributed to each of the client application 106, the management component 104, the operating system 108, the management service 142, and the network carrier 130 can be implemented in a single process or application or in multiple processes or applications. The separation or segmentation of functionality as discussed herein is presented for illustrative purposes only.

Beginning with step 201, the client application 106 can transmit a network call to the operating system 108 that causes the operating system 108 to establish a communication channel with a content provider 160 over the network 120 and causes the operating system 108 to receive content 162 from the content provider 160. In some examples, the client application 106 can transmit the network call in response to a user input to a user interface 114 provided by the client application 106, where the user input requests that the client application 106 receive (or access) content 162 from the content provider 160.

Next, in step 203, the management component 104 can intercept the network call transmitted from the client application 106 to the operating system 108. In some examples, the management component 104 can analyze all method calls transmitted from the client application 106 to the operating system 108, and can intercept network calls that cause the operating system 108 to receive content 162 from content providers 160. For example, the management component 104 can intercept network calls belonging to either of the NSURLSession or NSURLConnection Objective C classes that are transmitted to an Apple iOS® operating system.

Then, in step 205, the management component 104 can modify the intercepted network call to cause any content 162 received by the operating system 108 from the content provider 160 be returned to the management component 104. In some examples, the network call transmitted by the client application 104 to the operating system 108 specifies that the content 162 received by the operating system 108 from the content provider 160 should be returned to the client application 106. The management component 104 can cause the content to be returned to it—rather than the client application 106—by changing a source parameter of the network call from the client application 106 to the management component 104. This, in turn, can cause the operating system 108 to return the content 162 to the management component 104, which is interpreted to be the source of the network call requesting the content 162.

Next, in step 207, the management component 104 can transmit the modified network call to the operating system 108.

Then, in step 209, the operating system 108 can, in response to receiving the modified network call from the management component 104, cause the content 162 to be received from the content provider 160 and cause the content 162 to be returned to the management component 104. In some examples, the operating system 108 can cause a network interface of the client device 102 to establish a communication channel with the content provider 160 over the network 120 through which the operating system 108 can receive the content 162 from the content provider 160. Once the content 162 is received by the operating system 108, the operating system 108 can return the content 162 to the management component 104.

Next, in step 211, the management component 104 can, in response to receiving the content 162 from the content provider 160, analyze the content 162 for network usage and create a network usage analysis describing the network usage. In some examples, as described herein, the management component 104 can analyze the content 162 for network usage by analyzing the header of each data packet comprising the content 162 to identify a byte count associated with each data packet, and can sum the byte counts of the data packets comprising the content 162 to determine the amount of bytes sent over the network 120 to receive the content 162 from the content provider 160. Also, as described herein, the management component 104 can create a network usage analysis that includes one or more of the following properties describing the network usage: a client device ID, an application ID, a personal use indicator, an enterprise use indicator, a content provider ID, a content ID, a content type, a session duration, a bytes received quantity, a packets received quantity, a bytes transmitted quantity, a packets transmitted quantity, a network carrier ID, a cellular network indicator, a Wi-Fi network indicator, a roaming indicator, a MCC, or a MNC.

Then, in step 213, the management component 104 can provide the content 162 to the client application 160. In some examples, the management component 104 can transmit the content 162 to the client application 160 using a secure inter-process communication protocol. In other examples, the management component 104 can release certain access controls over the content 162, causing the content 162 to be accessible to the client application 106.

Next, in step 215, the management component 104 can report the network usage analysis to the management service 142. In some examples, the management component 104 can establish a secure communication channel with the management service 142 through which the management component 104 can transmit the network usage analysis to the management service 142.

Then, in step 217, the management service 142 can log the network usage analysis. In some examples, the management service 142 can identify one or more management accounts 146 associated with the network usage analysis (e.g., a user-specific management account, a device-specific management account, and a carrier account-specific management account) that are stored by the management service 142, and can add the network usage analysis to each. Additionally, the management service 142 can add the network usage analysis to a table of aggregated network usage analyses, where each network usage analysis line item describing an instance of network usage.

Further, in step 219, the management component 104 and/or the management service 142 can enforce compliance rules 148 that are violated. In some examples, compliance rules 148 can specify one or more remedial actions that should be performed if the conditions of the compliance rules 148 are not satisfied. The management component 104 and/or management service 142 can determine whether any remedial actions should be performed based on whether any information describing the network usage (such as that contained in the network usage analysis) indicates that the conditions of the compliance rules 148 are not satisfied. Additionally, the management component 104 and/or management service 142 can determine whether any remedial actions should be performed based on whether any information describing one or more associated management accounts 146 (such as information within an aggregate table of network usage analyses) indicates that the conditions of the compliance rules 148 are not satisfied.

If the compliance rules 148 are not satisfied, the management component 104 and/or management service 142 can cause one or more of the following remedial actions to be performed: cause a notification describing the violation of the compliance rule 148 to be transmitted to a user and/or administrator of an associated management account 142, cause a network interface of a client device 102 to be disabled, cause a particular client application 106 to be disabled, cause a network interface of a client device 102 to be inaccessible to a particular client application 106, cause a client device 102 to be disabled, or cause a request to replenish a data allotment of a carrier account to be transmitted to the network carrier 130.

Figure 3:
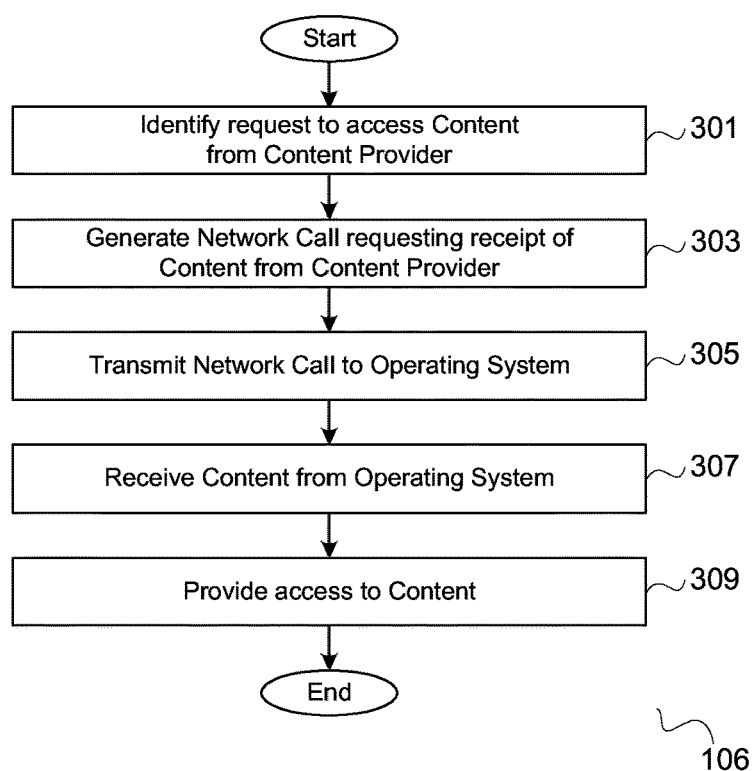
FIGS. 3-7 are flowcharts illustrating examples of functionality according to various examples of the present disclosure.

Turning now to FIG. 3, shown is a flowchart that provides an example of a portion of the operation of a client application 106. In particular, FIG. 3 provides an example of a client application 106 requesting that the operating system 108 of the client device 102 receive content 162 from a content provider 160 on its behalf. The flowchart of FIG. 3 can be viewed as depicting an example of a method implemented in the client device 102.

Beginning with step 301, the client application 106 can identify a request to access content 162 from a content provider 160. In some examples, the client application 106 can identify a user input that requests access to content 162 provided by a content provider 160, which is accessible to the client application 106 over a network 120.

Then, in step 303, the client application 106 can generate a network call that, when transmitted to the operating system 108, can cause the operating system 108 to receive the content 162 from the content provider 160 over the network 120. The network call can, for instance, be a method call within either of the NSURLSession or NSURLConnection Objective C classes, which when transmitted to an Apple iOS® operating system 108 cause the operating system 108 to invoke a network interface of the client device 102 to perform network operations, such as requesting and receiving content 162 from a content provider 160 over the network 120. In some examples, the client application 106 can configure a source parameter of the network call, causing the source parameter to reference the client application 106 as the source of the network call. Additionally, the client application 106 can configure a content parameter of the network call, causing the content parameter to reference the content 162 (e.g., a file name) that the client application 106 wishes to access. Furthermore, the client application 106 can configure a content provider parameter, causing the content provider parameter to reference the content provider 160 (e.g., a URL for the content provider 160) from which the client application 106 wishes to access the content 162.

Next, in step 305, the client application 106 can transmit the network call to the operating system 108.

Then, in step 307, the client application 106 can receive the content 162. In some examples, the client application 106 can receive the content 162 from a management component 104. In other examples, the client application 106 can receive the content 162 from the operating system 108 of the client device 102.

Further, in step 309, the client application 106 can provide access to the content 162. In some examples, the client application 106 can render the content 162 in a user interface 112 of the display 114 of the client device 102. Thereafter, the process can proceed to completion.

Figure 4:
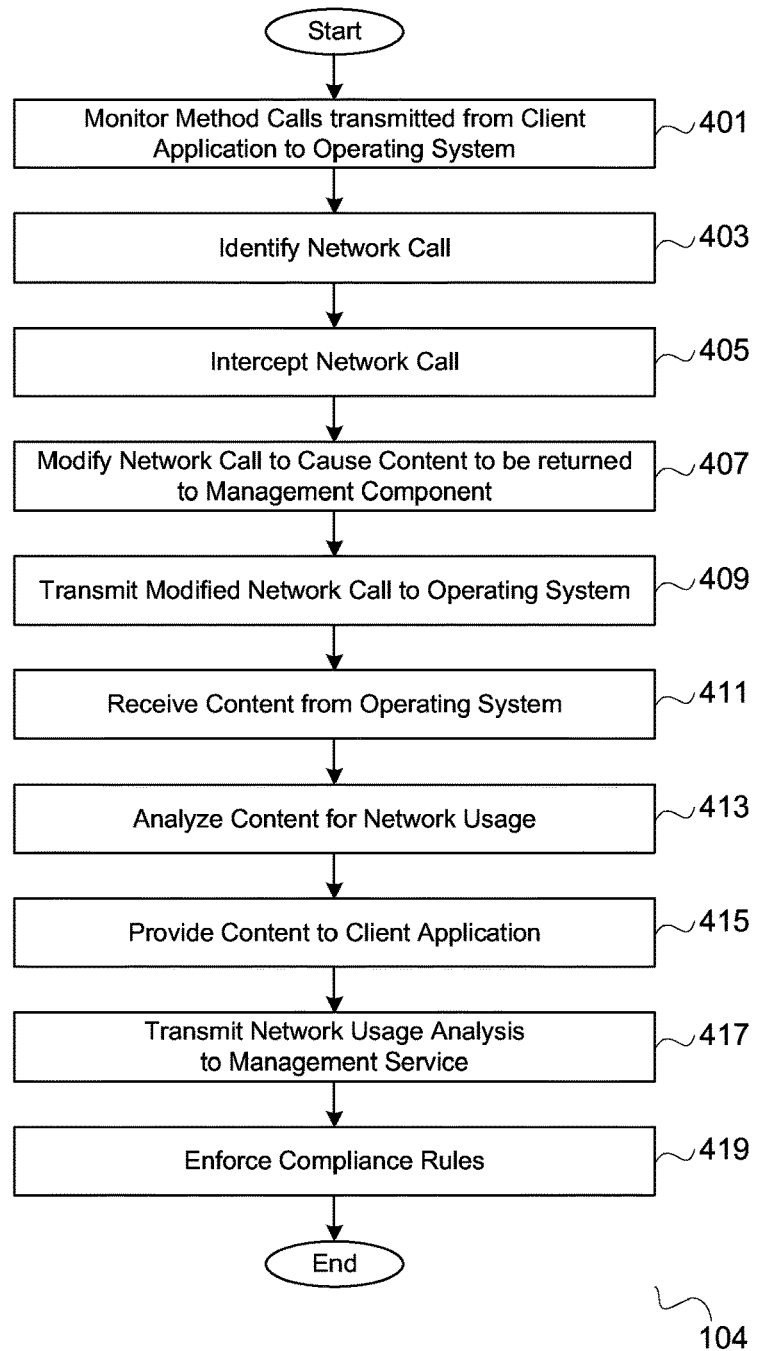

Turning now to FIG. 4, shown is a flowchart that provides an example of a portion of the operation of a management component 104. In particular, FIG. 4 provides an example of a management component 104 intercepting a network call, modifying the network call to cause content 162 to be returned to the management component 104, and analyzing the content 162 for network usage. The flowchart of FIG. 4 can be viewed as depicting an example of a method implemented in the client device 102.

Beginning with step 401, the management component 104 can monitor method calls transmitted from a client application 106 to an operating system 108 of a client device 102.

Then, in step 403, the management component 104 can identify a network call (amongst the monitored method calls transmitted from the client application 106 to the operating system 108). In some examples, the network call can cause the operating system 108 of the client device 102 to request and receive content 162 from a content provider 160 on behalf of the client application 106. For instance, the network call can be a method call within either of the NSURLSession or NSURLConnection Objective C classes, which can cause an Apple iOS® operating system 108 to receive content 162 from a content provider 160 over the network 120.

Next, in step 405, the management component 104 can intercept the network call. That is, the management component 104 can prevent the network call from reaching the operating system 108.

Then, in step 407, the management component 104 can modify the network call to cause the content 162 requested to be returned to the management component 104, rather than to the client application 106. In some examples, the management component 104 can modify the network call by changing a source parameter of the network call from a reference to the client application 106 to a reference to the management component 104. This, in turn, can cause the operating system 108 to return the content 162 to the management component 104.

Next, in step 409, the management component 104 can transmit the modified network call to the operating system 108 of the client device 102.

Then, in step 411, the management component 104 can receive the content 162 requested by the network call from the operating system 108 of the client device 102. The management component can also store the content 162 in a data store that is inaccessible to the client application 106.

Next, in step 413, the management component 104 can analyze the content 162 for network usage, and can create a network usage analysis. As described herein, the management component 104 can populate the network usage analysis with information describing one or more of: the network usage, the content 162, the user, the client device 102, or the carrier account 132 used to access the content 162. Additionally, as described herein, the management component 104 can source such information from one or more of: the data packets comprising the content 162, the operating system 108, the management service 142, the management gateway 150, or the network carrier 130.

Then, in step 415, the management component 104 can provide the content 162 to the client application 106. In some examples, the management component 104 can transmit the content 162 to the client application 106 through a secure inter-process communication protocol. In other examples, the management component 104 can release one or more access controls over the content 162 to permit the client application 106 to access the content 162, such as decrypting the content 162 and/or instructing the operating system 108 to grant the client application 106 permission to access the storage location of the content 162.

Next, in step 417, the management component 104 can transmit the network usage analysis to the management service 142. In some examples, the management component 104 can cause the operating system 108 to establish a secure communication channel between the management component 104 and the management service 142 through which the management component 104 can transmit the network usage analysis to the management service 142.

Then, in step 419, the management component 104 can enforce any compliance rules 148 that are violated based at least in part on the network usage. The management component 104 can, for instance, determine whether any compliance rules 148 are violated based on information describing network usage, and if so, can enforce one or more remedial actions specified by such violated compliance rules 148. Thereafter, the process can proceed to completion.

Figure 5:
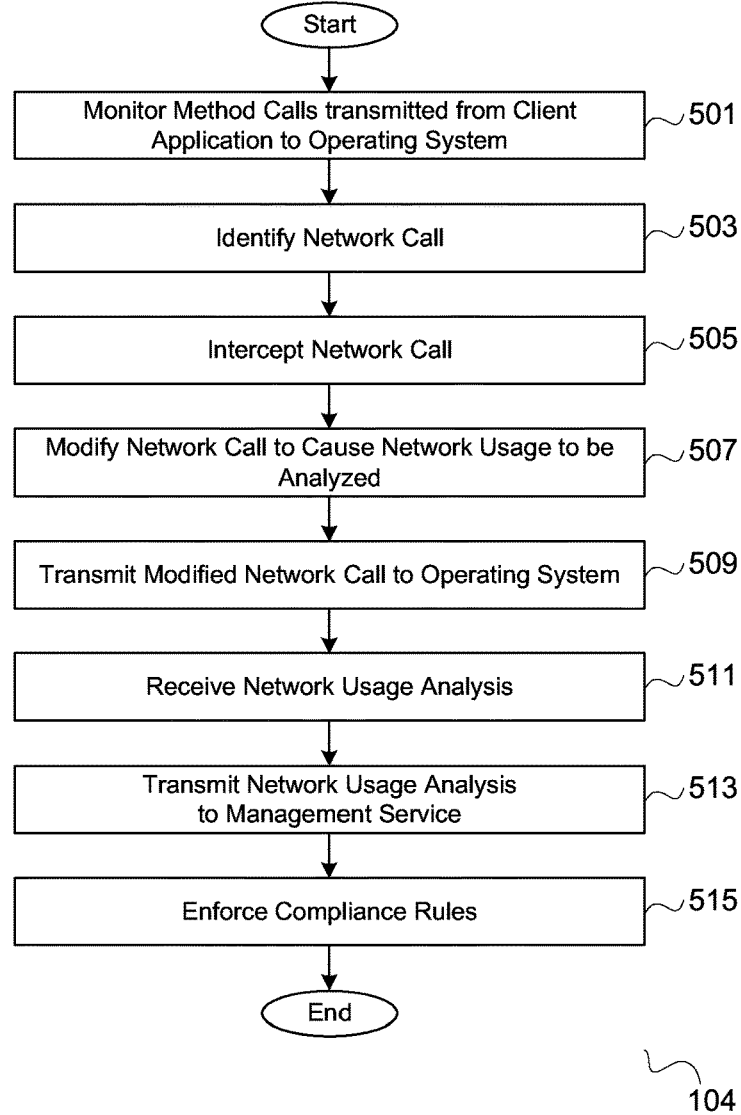

Turning now to FIG. 5, shown is a flowchart that provides an example of a portion of the operation of a management component 104. FIG. 5 provides an example of an alternative implementation of the process described in FIG. 4. In particular, FIG. 5 provides an example of a management component 104 intercepting a network call, modifying the network call to cause content 162 be analyzed for network usage, and transmitting the modified network call to the operating system 108 of the client device 102. The flowchart of FIG. 5 can be viewed as depicting an example of a method implemented in the client device 102.

Beginning with step 501, the management component 104 can monitor method calls transmitted from a client application 106 to an operating system 108 of a client device 102.

Then, in step 503, the management component 104 can identify a network call (amongst the monitored method calls transmitted from the client application 106 to the operating system 108). In some examples, the network call can cause the operating system 108 of the client device 102 to request and receive content 162 from a content provider 160 on behalf of the client application 106. For instance, the network call can be a method call within either of the NSURLSession or NSURLConnection Objective C classes, which can cause an Apple iOS® operating system 108 to receive content 162 from a content provider 160 over the network 120.

Next, in step 505, the management component 104 can intercept the network call. That is, the management component 104 can prevent the network call from reaching the operating system 108.

Then, in step 507, the management component 104 can modify the network call to cause the content 162 to be analyzed for network usage. That is, in addition to the network call causing content 162 to be received from a content provider 160 over the network, the network call can cause the content 162 to be analyzed for network usage. In some examples, the network call can be imbedded with logic or instructions that cause the content 162 to be analyzed for network usage when executed by a processor of the client device 102. In one example, the network call can cause the operating system 108 to analyze the content 162 for network usage before the operating system 108 returns the content 162 to the client application 102. In another example, the network call can cause the operating system 108 to pass the instructions causing the content 162 to be analyzed to the client application 102 (along with the content 162), and the client application 102 can analyze the content 162 for network usage.

Next, in step 509, the management component 104 can transmit the modified network call to the operating system 108 of the client device 102.

Then, in step 511, the management component 104 can receive a network usage analysis describing the network usage related to the receipt of the content 162 over the network 120. In some examples, the management component 104 can receive the network usage analysis from the operating system 108 of the client device 102. In other examples, the management component 104 can receive the network usage analysis from the client application 106. In any case, the management component 104 can store the network usage analysis in a data store accessible to the management component 104.

Next, in step 513, the management component 104 can transmit the network usage analysis to the management service 142. In some examples, the management component 104 can cause the operating system 108 to establish a secure communication channel between the management component 104 and the management service 142 through which the management component 104 can transmit the network usage analysis to the management service 142.

Then, in step 515, the management component 104 can enforce any compliance rules 148 that are violated based at least in part on the network usage. The management component 104 can, for instance, determine whether any compliance rules 148 are violated based on information describing network usage, and if so, can enforce one or more remedial actions specified by such violated compliance rules 148. Thereafter, the process can proceed to completion.

Figure 6:
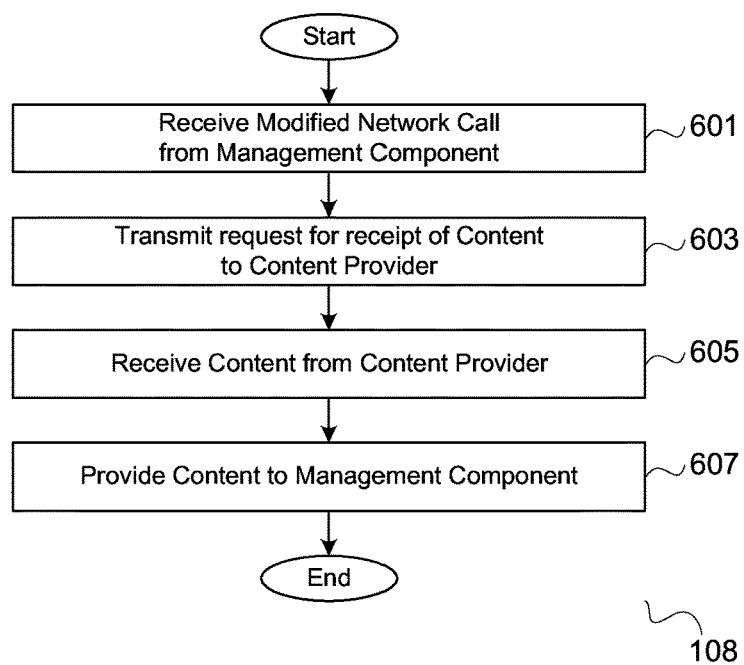

Turning now to FIG. 6, shown is a flowchart that provides an example of a portion of the operation of an operating system 108 of a client device 102. In particular, FIG. 6 provides an example of an operating system 108 receiving a modified network call, transmitting a request to receive content 162 from a content provider 160, receiving the content 162 from the content provider 160, and returns the content 162 to the source of the modified network call. The flowchart of FIG. 6 can be viewed as depicting an example of a method implemented in the client device 102.

Beginning with step 601, the operating system 108 can receive a modified network call from a management component 104. In some examples, the modified network call can be configured to cause the operating system 108 to request content 162 from a content provider 160 over the network 120, receive the content 162, and return the content 162 to the source of the modified network call.

Then, in step 603, the operating system 108 can transmit a request to receive content 162 to a content provider 160. In some examples, the operating system 108 can invoke a network interface of the client device 102 to cause the network interface to establish a communication channel with the content provider 160, through which the operating system 108 can transmit the request to receive content 162 to the content provider 160.

Next, in step 605, the operating system 108 can receive the content 162 from the content provider 160. In some examples, the operating system 108 can invoke a network interface of the client device 102 to cause the network interface to establish a communication channel with the content provider 160, through which the operating system 108 can receive the content 162 from the content provider 160. The operating system 108 can also store the content 162 in storage accessible to the operating system 108.

Further, in step 607, the operating system 108 can provide the content 162 to the management component 104. In some examples, the operating system 108 can transmit the content 162 to the management component 104 using a secure inter-process communication protocol. In other examples, the operating system 108 can provide the management component 104 with privilege to access a storage space where the content 162 is stored. In yet other examples, the operating system 108 can decrypt the content 162 to permit the management component 104 to decipher the content 162. Thereafter, the process can proceed to completion.

Figure 7:
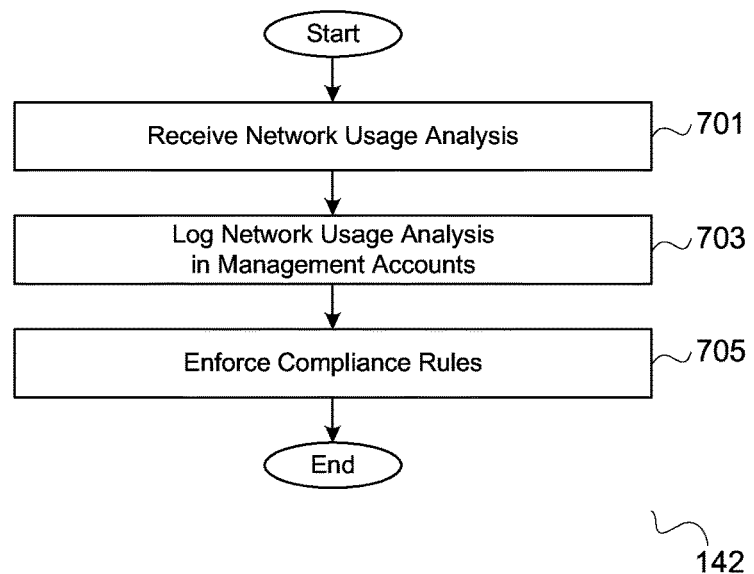

Turning now to FIG. 7, shown is a flowchart that provides an example of a portion of the operation of a management service 142. In particular, FIG. 7 provides an example of a management service 142 receiving a network usage analysis, logging the network usage analysis in one or more associated management accounts 142, and enforcing compliance rules 148 that are violated based at least in part on the network usage. The flowchart of FIG. 7 can be viewed as depicting an example of a method implemented in the management system 140.

Beginning with step 701, the management service 142 can receive a network usage analysis. In some examples, the network usage analysis can be received from a management component 104. In other examples, the network usage analysis can be received from an operating system 108 of a client device 102. In yet other examples, the network usage analysis can be received from a client application 106.

Then, in step 703, the management service 142 can log the network usage analysis in one or more management accounts 142 that are associated with the network usage analysis. For instance, the management service 142 can log the network usage analysis in a management account 142 associated with the client device 102 that consumed the network usage, management accounts 142 associated with users of the client device 102, and a management account 142 associated with a carrier account 132 used to access the network 120 during the network usage.

Further, in step 705, the management service 142 can enforce any compliance rules 148 that are violated based at least in part on the network usage. The management service 142 can, for instance, determine whether any compliance rules 148 are violated based on information describing network usage, and if so, can enforce one or more remedial actions specified by such violated compliance rules 148. Thereafter, the process can proceed to completion.

The flowcharts of FIGS. 2-7 show examples of the functionality and operation of implementations of components described herein. The components of the networked environment 100 described herein can be embodied in hardware, software, or a combination of hardware and software. If embodied in software, each step in the flowcharts of FIGS. 2-7 can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the flowcharts show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The management system 140 and client device 102 described herein can include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, portions of the management service 142, the management accounts 146, and the compliance rules 148 can be stored in one or more storage devices and be executable by one or more processors. Also, the management component 104, client applications 106, and operating system 108 can be located in the one or more storage devices.

The management service 142, the management component 104, client applications 106, and operating system 108 can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software or computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A system, comprising:
 a computing device comprising memory;
 a client application stored in the memory and being configured to communicate over a network by invoking a network call to an operating system of the computing device, the client application not comprising a mechanism to detect or share network usage; and
 a management component included in the client application before compilation as a software development kit (SDK) comprising executable instructions that, when executed by the computing device, cause the computing device to at least:
  identify the network call to the operating system of the computing device prior to the network call being invoked by the client application, wherein the network call is a method call in source code of the client application configured to:
    establish a communication channel with a content provider over a carrier network;
    cause the content provider to transmit content to the operating system over the carrier network; and
    cause the operating system to transmit the content to the client application;
  modify the network call to cause the management component to receive the content instead of the client application, wherein the management component is configured to:
    receive the content from the operating system as at least one data packet;
    determine that the content is one of personal network usage or enterprise network usage based at least in part on an application identifier of the client application;
    analyze a header of the at least one data packet to determine an amount of network usage;
    maintain a network usage analysis for the client application and a plurality of other client applications using the amount of network usage, wherein the network usage analysis comprises the personal network usage and the enterprise network usage; and
    execute the network call to provide the content to the client application.

2. The system of claim 1, wherein:
  the management component has at least one administrator privilege on the client device when the client device is enrolled with a remote management service over the carrier network; and
  the management component is further configured to cause the computing device to at least transmit the network usage analysis to the remote management service over the carrier network.

3. The system of claim 2, wherein the remote management service is configured to:
  determine that a compliance rule is violated based at least in part on the network usage analysis; and
  perform a remedial action specified by the compliance rule.

4. The system of claim 3, wherein the remedial action comprises causing the carrier network to be inaccessible to the computing device.

5. The system of claim 1, wherein the management component is further configured to cause the computing device to at least:
  transmit a request to a network carrier to replenish a data allotment associated with a carrier account corresponding to the computing device, wherein the carrier account is associated with a carrier network provided by the network carrier.

6. The system of claim 1, wherein the network call comprises a method call within at least one of the NSURLSession or NSURLConnection Objective C classes.

7. A non-transitory computer-readable medium storing a plurality of computer instructions for a management component included in a client application before compilation as a software development kit (SDK) executable by a computing device, the plurality of computer instructions being configured to cause the computing device to at least:
  identify a network call to an operating system of the computing device prior to the network call being invoked by the client application, wherein the network call is a method call in source code of the client application configured to:
    establish a communication channel with a content provider over a carrier network;
    cause the content provider to transmit content to the operating system over a carrier network; and
    cause the operating system to transmit the content to the client application;
  modify the network call to cause the management component of the computing device to receive the content instead of the client application, wherein the management component is configured to:
    receive the content from the operating system as at least one data packet;
    determine that the content is one of personal network usage or enterprise network usage based at least in part on an application identifier of the client application;
    analyze a header of the at least one data packet to determine an amount of network usage;
    update a network usage analysis maintained for the client application and a plurality of other client applications using the amount of network usage, wherein the network usage analysis comprises the personal network usage and the enterprise network usage; and
    execute the network call to provide the content to the client application.

8. The non-transitory computer-readable medium of claim 7, wherein:
  the management component has at least one administrator privilege on the client device when the client device is enrolled with a remote management service over the carrier network; and
  the plurality of computer instructions are further configured to cause the computing device to at least transmit the network usage analysis to the remote management service over the carrier network.

9. The non-transitory computer-readable medium of claim 8, wherein the remote management service is configured to:
  determine that a compliance rule is violated based at least in part on the network usage analysis; and
  perform a remedial action specified by the compliance rule.

10. The non-transitory computer-readable medium of claim 9, wherein the remedial action comprises causing the carrier network to be inaccessible to the computing device.

11. The non-transitory computer-readable medium of claim 7, wherein the plurality of computer instructions are further configured to cause the computing device to at least:
  transmit a request to a network carrier to replenish a data allotment associated with a carrier account corresponding to the computing device, wherein the carrier account is associated with a carrier network provided by the network carrier.

12. The non-transitory computer-readable medium of claim 7, wherein the network call comprises a method call within at least one of the NSURLSession or NSURLConnection Objective C classes.

13. A method, comprising:
  including a management component in a client application before compilation as a software development kit (SDK) comprising executable instructions for execution of the client application on a client device;

identifying, by the management component, a network call to an operating system of the client device prior to the network call being invoked by the client application, the network call being invoked as a method in source code of the client application to the operating system of the client device, wherein the network call is configured to:

establish a communication channel with a content provider over a carrier network;

cause a content provider to transmit content to the operating system over a carrier network; and cause the operating system to transmit the content to the client application;

modifying the network call to cause the management component to receive the content instead of the client application, wherein the management component is configured to:

receive the content from a network interface as at least one data packet;

determine that the content is one of personal network usage or enterprise network usage based at least in part on an application identifier of the client application;

analyze a header of the at least one data packet to determine an amount of network usage;

generate a network usage analysis for the client application and a plurality of other client applications using the amount of network usage, wherein the network usage analysis comprises the personal network usage and the enterprise network usage; and execute the network call to provide the content to the client application.

14. The method of claim 13, wherein:

the management component has at least one administrator privilege on the client device when the client device is enrolled with a remote management service over the carrier network; and the method further comprises transmitting the network usage analysis to the remote management service over the carrier network.

15. The method of claim 14, further comprising:

determining, by the remote management service, that a compliance rule is violated based at least in part on the network usage analysis; and performing, by the remote management service, a remedial action specified by the compliance rule.

16. The method of claim 15, wherein the remedial action comprises causing the carrier network to be inaccessible to the client device.

17. The method of claim 13, further comprising:

transmit a request to a network carrier to replenish a data allotment associated with a carrier account, wherein the carrier account is associated with a carrier network provided by the network carrier.

18. The method of claim 13, wherein the network call comprises a method call within at least one of the NSURLSession or NSURLConnection Objective C classes.

19. The method of claim 15, wherein the remedial action comprises disabling the client application.

20. The method of claim 15, wherein the compliance rule requires that a data allotment associated with a carrier account be greater than a size of the content.

* * * * *